(12) United States Patent
Park

(10) Patent No.: US 8,947,692 B2
(45) Date of Patent: Feb. 3, 2015

(54) IMAGE FORMING APPARATUS, POWER MANAGEMENT APPARATUS AND METHOD OF CONTROLLING THE SAME

(71) Applicant: Samsung Electronics Co., Ltd., Suwon-si (KR)

(72) Inventor: Young Jin Park, Bucheon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 86 days.

(21) Appl. No.: 13/712,392

(22) Filed: Dec. 12, 2012

(65) Prior Publication Data

US 2013/0194608 A1 Aug. 1, 2013

(30) Foreign Application Priority Data

Dec. 14, 2011 (KR) ........................ 10-2011-0134147

(51) Int. Cl.
| | |
|---|---|
| *G06K 15/00* | (2006.01) |
| *G06F 3/12* | (2006.01) |
| *H04N 1/00* | (2006.01) |
| *G03G 15/00* | (2006.01) |
| *H04N 1/32* | (2006.01) |

(52) U.S. Cl.
CPC ....... *H04N 1/00896* (2013.01); *G03G 15/5004* (2013.01); *G03G 15/5066* (2013.01); *G03G 15/5079* (2013.01); *G06F 3/1221* (2013.01); *G06F 3/126* (2013.01); *H04N 1/00344* (2013.01); *H04N 1/00891* (2013.01); *H04N 1/00954* (2013.01); *H04N 1/32523* (2013.01); *H04N 1/32539* (2013.01); *G06F 3/1288* (2013.01); *Y02B 60/1271* (2013.01)
USPC ........ 358/1.14; 358/1.13; 358/1.15; 358/1.16

(58) Field of Classification Search
None
See application file for complete search history.

(56) References Cited

U.S. PATENT DOCUMENTS

| | | | |
|---|---|---|---|
| 6,369,909 B1 | 4/2002 | Shima | |
| 7,555,660 B2 | 6/2009 | Kamisuwa et al. | |
| 2006/0158684 A1 | 7/2006 | Partanen et al. | |
| 2006/0238786 A1 | 10/2006 | Sakura et al. | |
| 2009/0070604 A1* | 3/2009 | Kumakura | 713/310 |

(Continued)

FOREIGN PATENT DOCUMENTS

GB 2478572 A 9/2011

OTHER PUBLICATIONS

European Patent Office Search report dated May 27, 2013 in Application No. EP 12 19 6961.

*Primary Examiner* — Satwant Singh
(74) *Attorney, Agent, or Firm* — Staas & Halsey LLP

(57) ABSTRACT

A power management apparatus is provided. The apparatus includes a communication unit configured to receive information on a price of power and communicate with image forming apparatuses, and a control unit configured to control image forming apparatuses to operate at a normal mode and/or a power saving mode by comparing the information received on the price of power with information on a standard price of power. A user may conduct a printing at a desired time to minimize inconvenience. A mode of the power management apparatus is determined according to the price of power such that a plurality of image forming apparatuses are operated at a normal mode when the price of power is low, and at least one image forming apparatuses is operated at a normal mode when the price of power is high, thereby reducing cost and enhancing the efficiency in managing the power.

35 Claims, 11 Drawing Sheets

(56) References Cited

U.S. PATENT DOCUMENTS

| | | |
|---|---|---|
| 2009/0322151 A1* | 12/2009 | Ferlitsch .................. 307/39 |
| 2009/0326728 A1 | 12/2009 | Chrisop et al. |
| 2010/0010857 A1* | 1/2010 | Fadell ....................... 705/8 |
| 2011/0002009 A1 | 1/2011 | Ohashi |
| 2011/0058211 A1 | 3/2011 | Noecker, Jr. et al. |
| 2011/0242565 A1 | 10/2011 | Armstrong |
| 2012/0072376 A1* | 3/2012 | Akiyama et al. ............. 705/400 |
| 2012/0215591 A1* | 8/2012 | Akiyama et al. ............. 705/7.35 |
| 2013/0030595 A1* | 1/2013 | Chow ....................... 700/297 |

* cited by examiner

IMAGE FORMING APPARATUS, POWER MANAGEMENT APPARATUS AND METHOD OF CONTROLLING THE SAME

CROSS-REFERENCE TO RELATED APPLICATIONS

This application is related to, and claims priority to, Korean Patent Application No. 10-2011-0134147, filed on Dec. 14, 2011 in the Korean Intellectual Property Office, the disclosure of which is incorporated herein by reference.

BACKGROUND

1. Field

Embodiments of the present disclosure relate to an image forming apparatus configured to manage power consumed at a plurality of apparatuses installed in a power management domain, a power management apparatus having the same, and a control method thereof.

2. Description of the Related Art

An image forming apparatus may be defined as an apparatus that records a letter or a picture, corresponding to a given signal, on a medium such as a paper.

The image forming apparatus may include a printer, a copier, a facsimile, and a multi functional device functioning as at least two of the apparatuses among the printer, the copier, and a facsimile.

The image forming apparatus may have a power saving mode, which shuts off the power supplied to some components, to reduce power consumption when a task such as printing is not conducted during a predetermined standby time.

The image forming apparatus, which already entered a power saving mode, conducts a task when a task request such as a printing request is received, and reenters the power saving mode only after a predetermined standby time elapses after the task is completed. Accordingly, unneeded power is consumed during the standby time.

Even in a case when a temporary printing task such as receiving a facsimile is needed, unneeded power is consumed until a standby time elapses after the printing of a facsimile data is completed.

In a power management domain in which a plurality of image forming apparatuses are installed, the power of the plurality of image forming apparatuses may be adjusted into two levels when the power consumption in the power management domain reaches a threshold value, thereby lowering the overall power consumption in the power management domain by reducing the power consumption of an image forming apparatus.

A plurality of image forming apparatuses enters a power saving mode after completing a printing operation when a power saving mode command is input from a power management apparatus. If a print inhibition flag is occurs afterwards, a printing operation is not conducted.

If a print inhibition flag does not occur in a state when a power saving mode command is not input, a printing is refrained by displaying a print cancellation message.

When a print inhibition flag occurs, a user may not be able to print at a desired time. Even when the print inhibition flag does not occur, a user may not be able to conduct printing at the desired time if the power consumption in a power management domain exceeds a threshold value.

To print an important document, an auxiliary power supply apparatus and a charging apparatus may be provided at an image forming apparatus. When a printing is conducted using the auxiliary power supply apparatus, the power of the auxiliary power supply apparatus may be discharged as a printing time progresses, and thereby unable to print in large quantity and continuously.

Since the power of an image forming apparatus is controlled not when the price of power is high but when the power consumption in a power management domain reaches a threshold value, the power of the image forming apparatus is controlled and a printing may not be conducted even when the price of the power is low.

When the price of power is high, a printing is conducted or an image forming apparatus is maintained at a normal mode, and thus the cost of power may increase.

SUMMARY

It is an aspect of the present disclosure to provide an image forming apparatus configured to control an image forming apparatus among the plurality of image forming apparatuses at a normal mode while controlling the remaining at a power saving mode if the current price of power is higher than the standard price of power, a power management apparatus, and a control method thereof.

It is an aspect of the present disclosure to provide an image forming apparatus where if the image forming apparatus receives a printing command at a power saving mode, configured to change an IP address and a printing language of the image forming apparatus which has received the printing command to an IP address and a printing language of an image forming apparatus at a normal mode, a power management apparatus, and a control method thereof.

It is an aspect of the present disclosure to provide an image forming apparatus capable of transferring printing information to a terminal which has requested a printing, a power management apparatus, and a control method thereof.

Additional aspects of the disclosure will be set forth in part in the description which follows and, in part, will be obvious from the description, or may be learned by practice of the disclosure.

In accordance with an aspect of the present disclosure, a power management apparatus includes a communication unit and a control unit. The communication unit may be configured to receive information on the price of power and communicate with a plurality of image forming apparatuses. The control unit may be configured to control at least one image forming apparatus among the plurality of image forming apparatuses at a normal mode and control the remaining image forming apparatuses at a power saving mode by comparing the information received on the price of power and information on a standard price of power.

The communication unit conducts a communication with at least one terminals, and the control unit determines the image forming apparatus at a normal mode if a printing is requested by the at least one terminal, and controls a transmission of position information of the image forming apparatus determined.

The power management apparatus includes a storage unit configured to store information on functions of the plurality of image forming apparatuses, and wherein the control unit determines an image forming apparatus having the most number of the functions among the image forming apparatuses and controls the determined image forming apparatus at a normal mode.

The power management apparatus includes a storage unit configured to store positions of the plurality of image forming apparatuses and the plurality of terminals, and wherein the control unit determines a position where the terminals are most concentrated based on the positions of the plurality of terminals, and controls the image forming apparatus, which is most closely installed to the position determined, at a normal mode.

The power management apparatus includes a storage unit configured to store a standby power and a consumption power of the plurality of image forming apparatuses, and wherein the control unit determines an image forming apparatus having the lowest standby power and the lowest consumption power among the image forming apparatuses by comparing the standby power and the consumption power of the plurality of image forming apparatuses, and controls the determined image forming apparatus at a normal mode.

The power management apparatus includes a storage unit which stores a usage frequency of the plurality of image forming apparatuses, and wherein the control unit determines an image forming apparatus having the highest usage frequency among the image forming apparatuses, and controls the determined image forming apparatus at a normal mode.

The control unit decides the number of image forming apparatuses to conduct a normal mode according to the information on the price of power.

The power management apparatus includes an input unit and a storage unit. The input unit may be configured to receive a priority order for a normal mode control of the plurality of image forming apparatuses, and a storage unit may be configured to store the priority order received. The control unit determines an image forming apparatus to conduct a normal mode among the image forming apparatuses according to the priority order selected by a user.

The power management apparatus includes an input unit which receives the information on the price of power.

The control unit, if the image forming apparatus which is requested with the printing through the terminal is at a power saving mode, changes an IP address of the image forming apparatus, which is requested with the printing, to an IP address of the image forming apparatus at a normal mode.

The control unit, if the image forming apparatus which is requested with the printing through the terminal is at a power saving mode, compares a printing language of the image forming apparatus which is requested with the printing with a printing language of the image forming apparatus at a normal mode; and if the two printing languages are different, changes the printing language of the image forming apparatus, which is requested with the printing, to the printing language of the image forming apparatus at a normal mode.

The control unit, if a printing is requested by at least one terminal in a state of when the information on the price of power is higher than the standard price of power, controls a transmission of the information on the price of power and information on printing inquiry to the terminal.

The control unit determines a printing availability time based on the information of the price of power and controls a transmission of the printing availability time determined.

In accordance with an aspect of the present disclosure, an image forming apparatus includes a communication unit, a power management unit, and a control unit. The communication unit may be configured to conduct a communication with at least one another image forming apparatus and receive a price of power from the at least one other image forming apparatus. The power management unit may be configured to compare the price of power received with a standard price of power and to control the at least one other image forming apparatus at a power saving mode if the price of the power received is higher than the standard price of power. The control unit may be configured to control a printing if the printing is requested by a terminal corresponding to the at least one other image forming apparatus in a state of the at least one other image forming apparatus is at a power saving mode.

The image forming apparatus includes a storage unit configured to store information of functions of the at least one other image forming apparatus, positions of the at least one other image forming apparatus, a standby power and a consumption power of the at least one other image forming apparatus, a usage frequency of the at least one other image forming apparatus, and positions of the at least one other image forming apparatus. The power management unit determines an image forming apparatus to be conducted at a normal mode based on at least one of the number of functions, the usage frequency, the standby power, the consumption power and the position of the at least one other image forming apparatuses, and the position of the terminal corresponding to the at least one other image forming apparatus.

The power management unit, if the other image forming apparatus is in plurality, compares the price of power received with the standard price of power to determine a price difference, and based on the price difference, controls at least one of the other image forming apparatuses at a normal mode.

The power management unit, if one of the other image forming apparatuses, which is requested with the printing through the terminal, is at a power saving mode, changes an IP address of the image forming apparatus which is requested with the printing to an IP address of the image forming apparatus.

The control unit, if one of the other image forming apparatuses, which is requested with the printing through the terminal is at a power saving mode, changes a printing language of the image forming apparatus which is requested with the printing to a printing language of the image forming apparatus.

In accordance with an aspect of the present disclosure, a power management method of managing a consumption power of a plurality of image forming apparatuses installed in a power management domain is as follows: A time variant price of power is checked. A standard price of power is compared with a price of power at a present time of the time variant price of power. At least one of the plurality of the image forming apparatuses is controlled at a normal mode if the price of power at the present time is higher than the standard price of power. The remaining image forming apparatuses are controlled at a power saving mode. The power management method includes controlling the plurality of image forming apparatuses at a normal mode if the price of power at a present time is lower than the standard price of power.

The controlling of at least one of the image forming apparatuses at a normal mode includes calculating a price difference between the price of power at a present time and the standard price of power, and deciding the number of image forming apparatuses which are to be controlled at a normal mode based on the price difference calculated.

The power management method includes, if a printing is requested by a terminal in a state of when the price of power at a present time is higher than the standard price of power, transmitting information on the price of power at the present time and information on a printing inquiry including a printing confirmation, a printing reservation, and a printing cancellation to the terminal.

The power management method includes conducting a printing through the image forming apparatus which is controlled at a normal mode when a printing confirmation command is received from the terminal.

The power management method includes, after the printing is completed, transmitting information on the printing completion and information on the image forming apparatus at where the printing is conducted to the terminal.

The power management method includes if a printing reservation command is received from the terminal, determining a time when the price of power is below the standard price of power based on the time variant price of power, and transmitting the determined time to the terminal as a printing availability time.

The power management method includes cancelling the printing when a printing cancellation command is received from the terminal.

The power management method, in a case when the image forming apparatus controlled at a normal mode is in plurality, includes determining an image forming apparatus closest to the terminal which has requested a printing based on each position of the plurality of image forming apparatuses controlled at the normal mode and the terminal, and deciding the image forming apparatus determined as an image forming apparatus for conducting the printing.

The power management method includes in a case when the image forming apparatuses controlled at a normal mode is in plurality, outputting information of the plurality of image forming apparatuses controlled at the normal mode on a display, and if information on a certain image forming apparatus among the plurality of image forming apparatuses is received from the terminal, deciding the certain image forming apparatus as an image forming apparatus for conducting a printing.

The power management method includes, if a printing is requested through a terminal, determining an image forming apparatus which is requested with the printing through the terminal, determining whether the image forming apparatus determined is at a power saving mode, and if the image forming apparatus which is requested with the printing is at a power saving mode, changing an IP address of the image forming apparatus which is requested with the printing to an IP address of the image forming apparatus controlled at a normal mode.

The power management method includes comparing a printing language of the image forming apparatus which is requested with the printing with a printing language of the image forming apparatus at a normal mode; and changing the printing language of the image forming apparatus which is requested with the printing to the printing language of the image forming apparatus controlled at the normal mode if the printing language of the image forming apparatus which is requested with the printing and the printing language of the image forming apparatus at the normal mode are different.

The controlling of the at least one image forming apparatuses at a normal mode includes deciding an image forming apparatus to be conducted at a normal mode based on at least one of function information of the plurality of image forming apparatuses, positions of the plurality of image forming apparatuses, standby power information and consumption power information of the plurality of image forming apparatuses, usage frequency information of the plurality of image forming apparatuses, and position information of at least one terminal.

The checking of the time variant price of power includes checking a time variant price of power transmitted from outside.

The checking of the time variant price of power includes checking a time variant price of power input through an input unit.

A user may conduct a printing at a desired time. For such, an inconvenience of the user may be minimized.

A unit cost may be reduced by eliminating an auxiliary power supply apparatus and a charging apparatus in an image forming apparatus.

The mode of a power management apparatus may be determined according to the price of power such that a plurality of image forming apparatuses is operated at a normal mode in a case when the price of power is low and at least one image forming apparatus is operated at a normal mode in a case when the price of power is high, thereby reducing the cost of power in a power management domain and efficiently managing the power in the power management domain.

When the power management domain is an office space, the productivity of work in a work environment may be enhanced, the management and operating costs of the office space may be saved, the convenience of a user may be maximized, and the maintenance and repair may be conducted easily.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
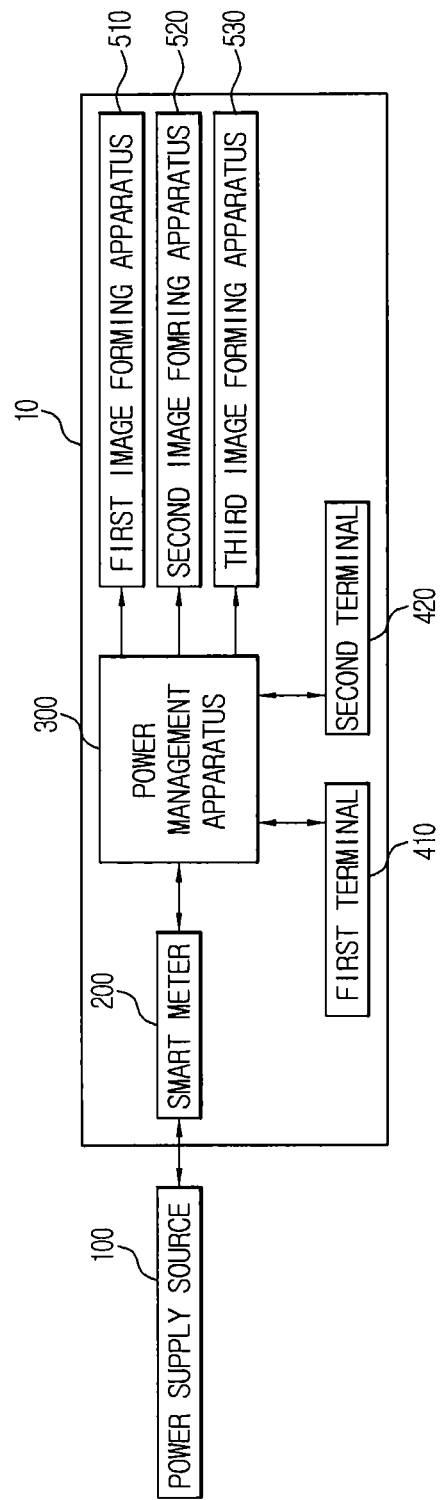
FIG. 1 illustrates a power management system provided with a power management apparatus according to an embodiment.

Reference will now be made in detail to exemplary embodiments of the present disclosure, examples of which are illustrated in the accompanying drawings, wherein like reference numerals refer to like elements throughout.

Figure 2:
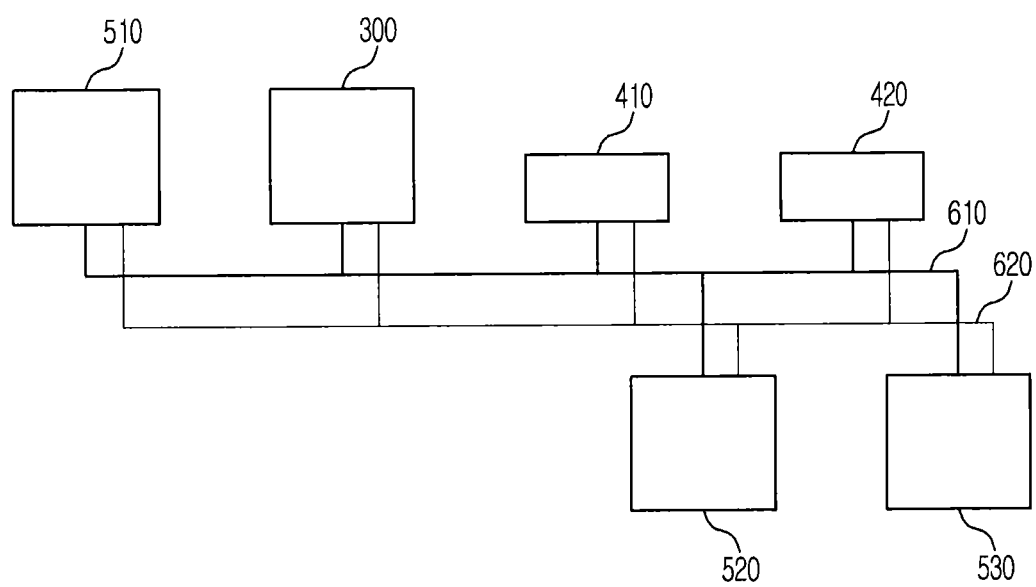
FIG. 2 illustrates a connection among the power management apparatus, a terminal, and an image forming apparatus of the power management system according to an embodiment.

FIG. 1 illustrates a power management system provided with a power management apparatus according to an embodiment. FIG. 2 illustrates a connection among a power management apparatus, a terminal, and an image forming apparatus of the power management system according to an embodiment.

Referring to FIG. 1, a power management system includes a power supply source 100, a smart meter 200, a power management apparatus 300, a plurality of terminals 410 and 420, and a plurality of image forming apparatuses 510, 520, and 530.

Referring to FIG. 2, the smart meter 200 (not shown), the power management apparatus 300, the plurality of terminals 410 and 420, and the plurality of image forming apparatuses 510, 520, and 520 may be supplied with the power needed for driving via a power line 610 in a power management domain, and the smart meter 200, the power management apparatus 300, the plurality of terminals 410 and 420, and the plurality of image forming apparatuses 510, 520, and 530 receive/transmit information to each other via a communication line 620 in the power management domain.

Without the smart meter 200, a communication with the power supply source 100 is possible via the power management apparatus 300.

The power management apparatus 300 and the plurality of terminals 410 and 420 conduct a wire/wireless communication. A terminal, not via the power line 610, but via an auxiliary power supply unit (not shown), may receive the power needed for driving.

The power supply source 100 includes a power supply apparatus which produces and supplies power, and the power supply apparatus is operated by a utility company. The utility company generates power through nuclear power, hydraulic power, thermal power and wind power, and supplies the power generated to a customer.

The end user consumes the power needed to drive a plurality of loads, and a power management domain 10 may be set for managing the amount of power consumed at the plurality of loads by each customer.

While the power supply source 100 generates a constant amount of power every hour and supplies to a plurality of power management domains 10, the amount of power consumed at the plurality of power management domains 10 is largely different on an hourly basis. For example, the amount of power consumed at the plurality of power management domains in the early morning and in the morning may be less than in the afternoon and in the evening, and the amount of power consumed at the plurality of power management domains in spring and in autumn may be less than in summer and in winter.

Accordingly, the power supply source 100 sets the price of power at a time having less power consumption to be lower than the price of power at a time having more power consumption, sets the price of power of the season having less power consumption to be lower than the price of power of the season having more power consumption, and supplies power having a different price to the plurality of power management domains.

That is, the power supply source 100 establishes the price of power after forecasting the amount of power consumption based on the amount of power generated, the past usage information by season and time, and the climate information. According to the price of power, establishing a price level is possible.

As such, the power supply source 100, in connection with the power consumption of the plurality of power management domains, establishes the price of power differently in a flexible manner, thereby supplying to each of the plurality of power management domains to match the supply and consumption of power.

The power supply source 100 collects the amount of power consumed at each power management domain 10 according to the price of power, calculates the cost of power at each power management domain on a monthly basis, and enables a charge to a user at the power management domain for the cost of power calculated on the monthly basis.

The power supply source 100 decides the restriction of power supply by comparing the cost of power calculated on a periodic basis and the monthly set cost of power which is pre-established, and if the cost of power calculated exceeds the monthly set cost of power, transmits information on the excess over the monthly set cost of power to the power management apparatus 300 provided at the corresponding power management domain, thereby enabling a monthly cost excess event of power to occur.

The power supply source 100 stores a monthly set threshold amount of power by each power management domain. The power supply source 100 determines the restriction of power supply by comparing the monthly set threshold with a monthly consumed amount of power.

The power supply source 100, based on either the monthly set threshold amount of power or the monthly set cost of power, manages the demand of the power at the power management domain.

The power supply source 100 may be connected, via a network, to at least of the smart meter 200 and the power management apparatus 300 provided at the plurality of power management domains 10, and receives/transmits information for managing the demand of power. A network may include a wireless network, a combination of wire/wireless network, etc., and/or a wired network.

The smart meter 200 may be installed in the power management domain 10, receives information on the price of power from the power supply source 100, and transmits the information received on the price of power to the power management apparatus 300.

The smart meter 200 has a display such as a liquid crystal display (LCD), and displays the amount of power consumed at the power management domain in real time.

That is, the smart meter 200 is a communicable electronic watt-hour meter, and by conducting a two-way communication with the power supply source 100 and the power management apparatus 300, transmits the amount of power consumed to the power supply source 100 and to the power management apparatus 300.

The smart meter 200, for example, when a price level is transmitted from the power supply source 100, displays the price level transmitted, and is capable of transmitting information on the price level to the power management apparatus 300.

The power management apparatus 300 conducts a communication with the smart meter 200, and receives at least one of the price of power and the price level corresponding to the price of power from the smart meter 200.

The power management apparatus 300 conducts a communication with the plurality of terminals 410 and 420 and the plurality of image forming apparatuses 510, 520, and 530, and receives and stores the information from each of the plurality of terminals 410 and 420 and the plurality of image forming apparatuses 510, 520, and 530.

The power management apparatus 300 receives a printing command from at least one of the plurality of terminals 410 and 420, and transmits printing information to the terminal which has requested for printing.

The printing information includes printing completion information, position information on the image forming apparatus printed, etc.

The power management apparatus 300 decides the power management mode, that is, a normal mode or a power saving mode, for each of the plurality of image forming apparatuses 510, 520, and 530, and to operate at the power management mode decided, controls the operation of the plurality of image forming apparatuses 510, 520, and 530.

The power management apparatus 300, for example, when only the price of power is transmitted from the power supply source 100, may establish the price level based on the price of power. The power management apparatus 300 receives information on the price of power of the power supply source 100 provided via the smart meter 200 in a certain time interval, and establishes the price level according to the price of power using the information on the price of power on a certain hourly basis.

The power management apparatus 300 receives information on the monthly excess threshold amount of power and information on the monthly excess set cost of power from the power supply source 100, notifies such to a user, compares the amount of power by on an hourly basis with the amount of power permitted, and notifies to the user the excess time of the amount of power consumed over the amount of power permitted.

The power management apparatus 300, based on at least one of the information on the monthly excess threshold amount of power, the information on the monthly excess set cost of power, and the excess amount of power permitted is capable of controlling the power management mode, that is, normal mode or a power saving mode of the plurality of image forming apparatuses 510, 520, and 530 and.

A power management apparatus 300 may be realized by a server or a terminal.

Figure 3:
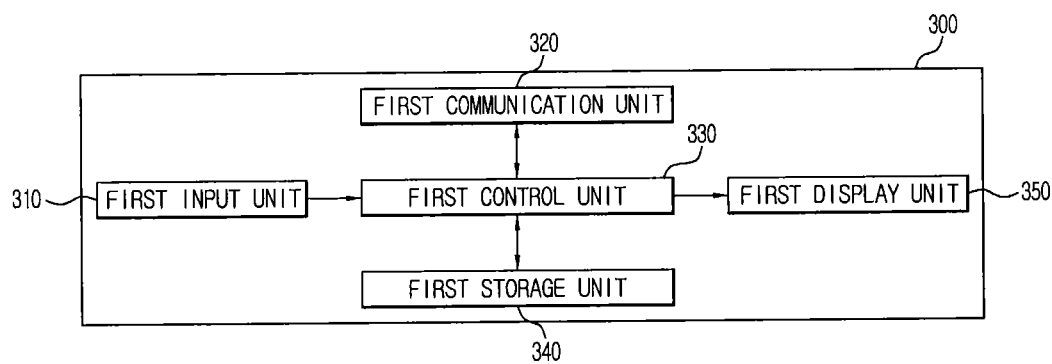
FIG. 3 illustrates a power management apparatus of a power management system according to an embodiment.

An exemplary power management apparatus 300 is explained referring to FIG. 3.

Referring to FIG. 3, the power management apparatus 300 includes a first input unit 310, a first communication unit 320, a first control unit 330, a first storage unit 340, and a first display unit 350.

The first input unit 310 receives the position information on each the plurality of terminals and the plurality of image forming apparatuses, and receives a priority order of image forming apparatuses which are to be controlled at a normal mode.

The first input unit 310 may be capable of directly receiving the price of power on an hourly basis and the price level from the user.

The first input unit 310 is capable of directly receiving a command to select/deselect the power management mode of the plurality of image forming apparatuses from the user. The first control unit 330 controls the power management mode of the plurality of image forming apparatuses until the power management mode is deselected by the user regardless of the price of power.

The first communication unit 320, by conducting a communication with the smart meter 200, transmits at least of the price of power and the price level corresponding to the price of power from the smart meter 200 to the first control unit 330, conducts a communication with the plurality of terminals 410 and 420 and the plurality of image forming apparatuses 510, 520, and 520, receives information from each of the plurality of terminals 410 and 420 and the plurality of image forming apparatuses 510, 520, and 530, and transmits the information to the first control unit 330. The price of power is the price of power on an hourly basis.

The information includes position information on each of the plurality of terminals 410 and 420, and position information, function information, standby power information, consumption power information, IP address, and a printing language on each of the plurality of image forming apparatuses 510, 520, and 530. The position information has coordinate values.

The first communication unit 320, by transmitting various user information stored in the first storing unit 330 to the power supply source 100, is capable of determining where the information on the consumption power on an hourly basis belongs to which power management domain.

The first control unit 330, based on either the price of power or the price level among information on the price of power, controls the power management mode of the plurality of image forming apparatuses. The power management mode may be controlled only by using the price of power, as an example.

The power management mode includes the normal mode, which is supplied with the power needed for driving, and the power saving mode, which minimizes the amount of consumption power by being supplied with the power needed only for a wake-up of a third control unit and a third communication unit.

The first control unit 330, if the price of power is transmitted via the first input unit 310 or via the first communication unit 320, compares the price of power transmitted with the standard price of power; if the price of power transmitted is higher than the standard price of power, controls at least one of the image forming apparatuses at the normal mode; and controls the remaining image forming apparatuses at the power saving mode.

The standby power is eliminated as the remaining image forming apparatuses hereby enter the power saving mode and performs no printing task, thereby reducing the overall consumption power.

The first control unit 330, based on the information on the plurality of image forming apparatuses and the plurality of terminals, controls at least one of the image forming apparatuses at the normal mode.

A decision on the image forming apparatus, which is to be conducted at the normal mode, may be made based on one of the function information of the plurality of image forming apparatuses, the position information of the plurality of image forming apparatuses, the standby power of the plurality of image forming apparatuses, the consumption power of the plurality of image forming apparatuses, the usage frequency information of the plurality of image forming apparatuses, and the position information on at least one terminals.

The first control unit 330 calculates the price difference between the price of power at a present time and the standard price of power, and decides a number of image forming apparatuses which are to be controlled at the normal mode according to the price difference calculated. The number of image forming apparatuses, which are to be controlled at the normal mode, may be decided according to the priority order selected by the user.

The first control unit 330, if a printing is requested by a terminal where the price of power at the present time, among the information received on the price of power on an hourly basis, is higher than the standard price of power, transmits information to make an inquiry on the price of power at the present time, a printing cancellation, a printing confirmation, and a printing reservation to the certain terminal.

The first control unit 330 is capable of receiving the printing request from the plurality of terminals 410 and 420, conducting a printing based on the order of the printing request is received, and transmitting information on the printing completion to each of the plurality of terminals.

The first control unit 330, if a printing is requested by a certain terminal where the price of power at the present time among the information received on the price of power on an hourly basis is higher than the standard price of power, may control the printing without making an inquiry on a printing cancellation, a printing confirmation, and a printing reservation to the certain terminal.

The first control unit 330, by comparing the price of power on an hourly basis with the standard price of power, determines the time when the price of power is below the standard price of power. The time determined serves as the time that the printing is available, and the time available for the printing is transmitted to the terminal which requested the printing.

The first control unit 330, when the printing is requested by a certain terminal, determines an image forming apparatus at a normal mode, and transmits position information on the image forming apparatus determined to the certain terminal.

The first control unit 330, if a plurality of the image forming apparatuses are in the normal mode, is capable of checking the position of the terminal which has requested the printing; comparing each of the positions of the terminal checked and the position of the plurality of image forming apparatuses at the normal mode, determining an image forming apparatus, among the plurality of image forming apparatuses at the normal mode, which is closest to the terminal checked; and transmitting information on a printing recommendation with reference to the determined image forming apparatus to the terminal.

The first control unit 330, if the image forming apparatus which is requested by the certain terminal with a printing is in the power saving mode, changes an IP address of the image forming apparatus which is requested with the printing to an IP address of an image forming apparatus at a normal mode.

The first control unit 330, if the image forming apparatus which is requested with a printing via the certain terminal is at the power saving mode, compares a printing language of the image forming apparatus which is requested with a printing with a printing language of the image forming apparatus at the normal mode, and if the printing language of the image forming apparatus which is requested with the printing and the printing language of the image forming apparatus at the normal mode are different, changes the printing language of the image forming apparatus which is requested with the printing to the printing language of the image forming apparatus at the normal mode.

The first storage unit 340 stores each position information of the plurality of terminals 410 and 420, and each position information, the function information, the information on standby power, the information on consumption power, the IP address, and the printing language of the plurality of image forming apparatuses 510, 520, and 530. The position information may include coordinate values.

The first storage unit 340 stores the price of power on an hourly basis, stores the standard price of power, stores the priority order of the image forming apparatuses which are to be controlled at the normal mode, and stores printing data transmitted from the terminal for a certain period of time.

The first display unit 350 displays the selection/deselection of the power management mode, and differently displays the image forming apparatus at the normal mode and the image forming apparatus at the power saving mode to one another.

The first display unit 350 may display the price of power on an hourly basis.

The first display unit 350 may have a form of a touch screen that may be integrated with the first input unit 310.

Figure 4:
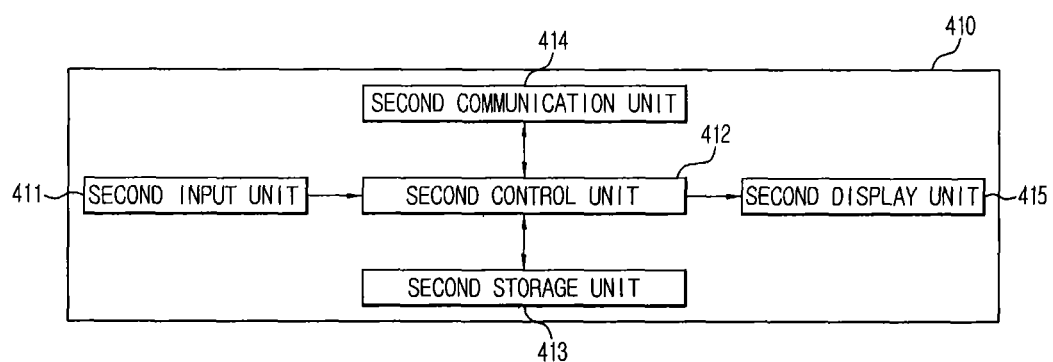
FIG. 4 illustrates a terminal that conducts communication with a power management apparatus of a power management system according to an embodiment.

FIG. 4 illustrates a terminal that conducts a communication with the power management apparatus of the power management system according to an embodiment.

The first and the second terminals 410 and 420 include a computer, a notebook, and a Tablet which are installed in the power management domain such as an office space.

The first and the second terminals 410 and 420 include the identical composition of elements to one another, and therefore, the first terminal 410 will be used as an example for explanations.

The first terminal 410 includes a second input unit 411, a second control unit 412, a second storage unit 413, a second communication unit 414, and a second display unit 415.

The second input unit 411 is input with the printing command, and may be selected with the printing confirmation, the printing cancellation, and the printing reservation if the power management mode is established; and is selected with the image forming apparatus for printing if the image forming apparatus at the normal mode is in plurality.

The second control unit 412, if the printing command is input via the second input unit 411, controls transmitting the printing data, the IP address, and the printing language.

The second control unit 412, if the printing completion information and the position information on the image forming apparatus at the normal mode are transmitted from the power management apparatus 300, controls the driving of the second display unit 415 so that the printing completion information and the position information on the image forming apparatus at the normal mode are displayed.

The second control unit 412, in order for an IP address and a printing language of the second control unit 412 to be stored at the power management apparatus 300, controls transmitting the IP address and the printing language of the second control unit 412.

The reason for such is to transmit the information on the printing information in a case when the printing command is input to the power management apparatus 300. The printing information includes the printing command, the printing confirmation, the printing cancellation, and the printing reservation.

The second storage unit 413 stores driver setup information of at least one image forming apparatus, and stores IP address and printing language of the image forming apparatus having the driver set up.

The second communication unit 414 transmits the printing command to the power management apparatus 300, transmits the printing completion information and the position information of the image forming apparatus at the normal mode, which are transmitted from the power management apparatus 300, to the second control unit 412, and transmits one of the information among the printing confirmation, the printing cancellation and the printing reservation which are selected by the user to the power management apparatus 300.

The second communication unit 414 transmits the printing data along with the printing command to the power management apparatus 300.

The second display unit 415 displays the printing completion information and the position information of the image forming apparatus at the normal mode through a pop-up window.

Figure 5:
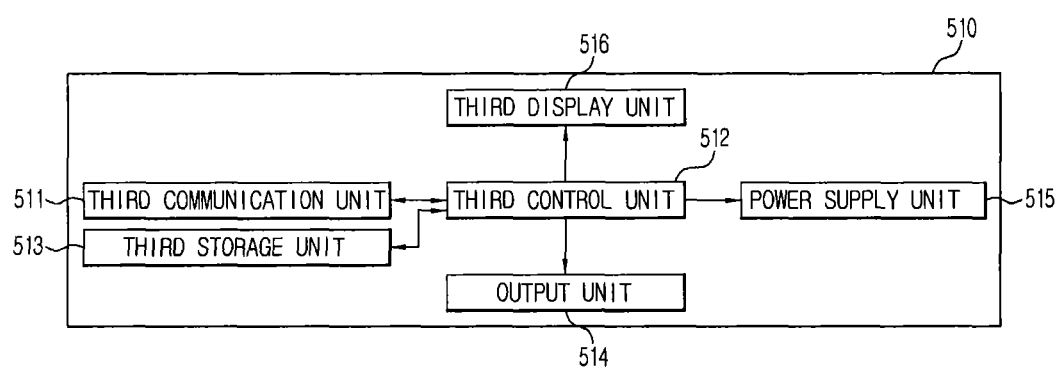
FIG. 5 illustrates an image forming apparatus that conducts a communication with a power management apparatus of a power management system according to an embodiment.

FIG. 5 illustrates the image forming apparatus that conducts a communication with the power management apparatus of the power management system according to an embodiment. The plurality of image forming apparatuses includes the identical component of elements, and therefore, a first image forming apparatus will be used as an example for explanations.

The image forming apparatus 510 includes a third communication unit 511, a third control unit 512, a third storage unit 513, an output unit 514, a power supply unit 515, and a third display unit 516.

The third communication unit 511 conducts a communication with a terminal having a driver of the third communication unit 511 set up, and if a printing command is received from the corresponding terminal, transmits the printing command received to the third control unit 512.

The third communication unit 511, if either the normal mode or the power saving mode of the power management mode is received from the power management apparatus 300, transmits information on the power management mode received to the third control unit 512.

The third control unit 512, if the printing command is transmitted via the third communication unit 511, controls the driving of the output unit 514 so that printing data is printed.

The third control unit 512, for either the normal mode or the power saving mode is to be conducted according to the power management mode transmitted via the third communication unit 511, controls the driving of the power supply unit 515.

The third control unit 512 controls the transmission of the IP address and the printing language of the third control unit 512 so that the IP address and the printing language of the third control unit 512 may be stored at the power management unit 300.

The third storage unit 513 stores the IP address of the third storage unit 513, and stores the printing data to be printed for a certain period of time.

The output unit 514 conducts the printing task according to the command of the third control unit 512.

The power supply unit 515 includes a switch and a relay, conducts the normal mode that supplies the power to each component unit according to the command of the third control unit by turning on/off the driving of the switch, and the relay, or conducts the power saving mode that supplies the power to either one of the third communication unit 511 and the third control unit 512 so that a wake-up may be possible.

The third display unit 516 displays the current mode of the third display unit 616 among the power management mode, that is, either the normal mode or the power saving mode.

Figure 6:
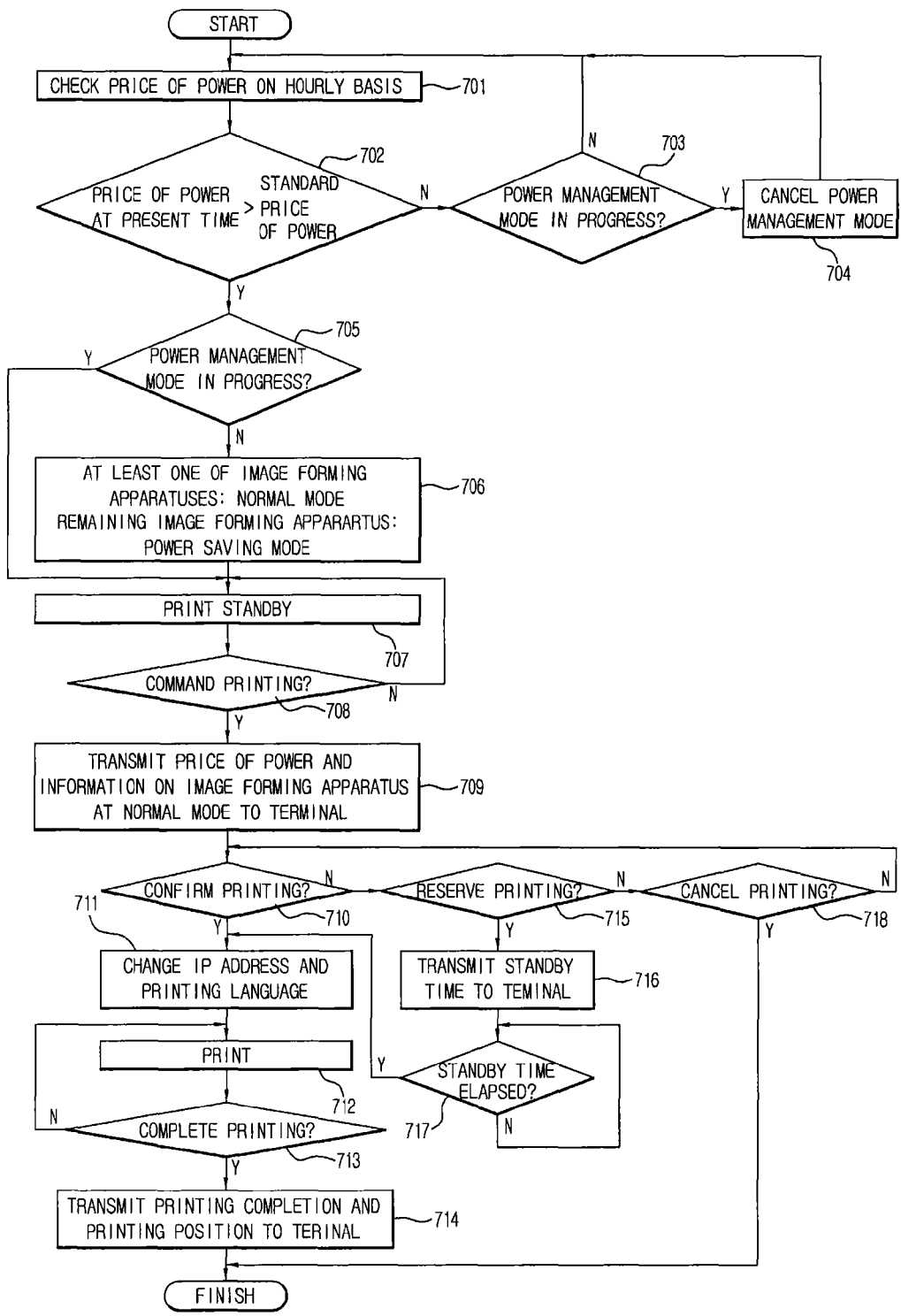
FIG. 6 illustrates a power management control of a power management apparatus of the power management system according to an embodiment.

FIG. 6 illustrates a power management control of the power management apparatus of the power management system according to an embodiment.

Figure 7:
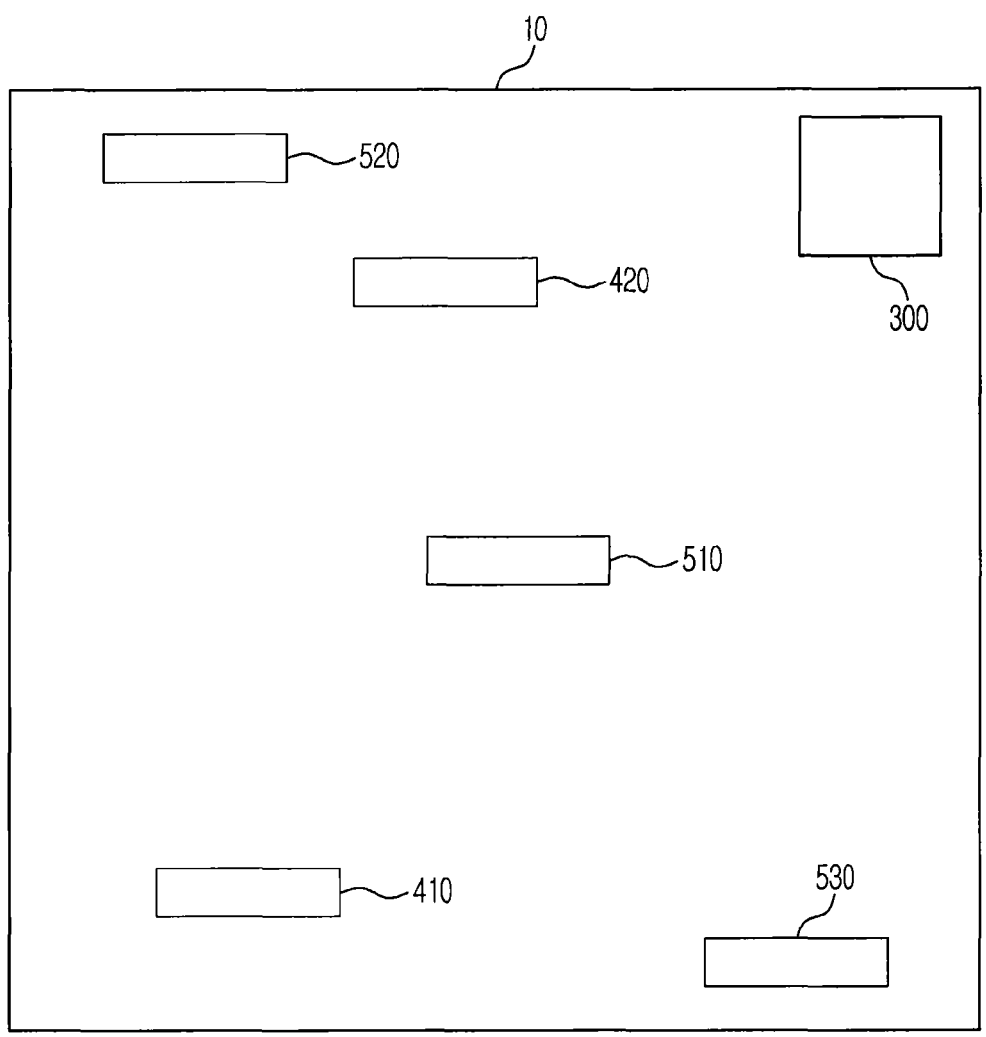
FIG. 7 illustrates a power management domain in which a power management apparatus according to an embodiment is provided.

As illustrated in FIG. 7, the plurality of image forming apparatuses 510, 520, and 530 and the plurality of terminals 410 and 420 may be in a power management domain 10, such as an office space or a building, and the power management control method of the power management apparatus 300 controls the consumption power of the plurality of image forming apparatuses.

The power management apparatus 300 checks the price of power, for example, on an hourly basis (operation 701).

The price of power on an hourly basis may be input via the first input unit 310 of the power management apparatus 300, or received from the power supply unit 100 via the first communication unit 320.

The power management apparatus 300 compares the price of power at the present time among the checked price of time on an hourly basis with the standard price of power (operation 702).

if the price of power at the present time is lower than the standard price of power, the power management apparatus 300 determines whether the power management mode is already being conducted (operation 703); and if the power management mode is already being conducted, the power management mode is cancelled (operation 704), and if the power management mode is not being conducted, the price of power on an hourly basis is periodically checked.

Releasing the power management mode represents changing the power mode of the plurality of image forming apparatuses to the normal mode.

If the price of power at the present time is higher than the standard price of power, the power management apparatus 300 determines whether the power management mode is already being conducted (operation 705); and if the power management mode is not being conducted, the power management mode then decides at least one image forming apparatus to conduct at the normal mode.

An exemplary example of a method of deciding the at least one image forming apparatus to conduct at the normal mode is disclosed.

Based on the each function information of the plurality of image forming apparatuses, the number of the functions of the plurality of image forming apparatuses may be determined, and the image forming apparatus having the most number of the functions as the image forming apparatus to control at the normal mode may be determined.

The functions include reserve functions such as black/color, the printing function, a scanning function, a facsimile function, and a copying function.

Based on the position information of the plurality of terminals, a most concentrated position of the terminals may be determined, and the image forming apparatus that is closest to the position determined as the image forming apparatus to control at the normal mode.

The standby power and the consumption power of the plurality of image forming apparatuses may be compared, the image forming apparatus having the lowest standby power and the consumption power is determined, and the image forming apparatus determined is decided as the image forming apparatus to control at the normal mode.

The number of usages of the plurality of image forming apparatuses may be counted, the usage frequency is determined based on the usage counted, and the image forming apparatus having the most usage frequency determined is decided as the image forming apparatus to control at the normal mode.

The power management apparatus 300 changes at least one image forming apparatus determined to the normal mode, changes the state of the remaining image forming apparatuses to the power saving mode (operation 706), and conducts a standby printing mode afterwards (operation 707).

When the price of power at the present time is higher than the standard price of power, if the power management mode is already being conducted, the standby printing mode may be maintained, since the image forming apparatus to be conducted at the normal mode may already be decided.

Changing at least one image forming apparatus to the normal mode includes calculating the price difference of the price of power at the present time and the standard price of power, and deciding the number of the image forming apparatuses to be changed to the normal mode based on the price difference calculated. The more difference of the price, the less number of the image forming apparatuses to be changed to the normal mode.

The power management apparatus 300 determines whether a printing command is input from a terminal (operation 708). The power management apparatus 300, when the printing command is input, receives information on the image forming apparatus which is set up at the terminal and printing data.

The power management apparatus 300, if the printing command is input from the terminal, transmits the price of power at the present time and information on the image forming apparatus at the normal mode to the terminal having transmitted the printing command (operation 709).

That is, when the price of power at the present time is higher than the standard price of power, if the printing is requested by the terminal, the price of power at the present time, the position information on the image forming apparatus at the normal mode, and inquiry information with reference to the printing such as the printing confirmation, the printing reservation, and the printing cancellation are transmitted to the terminal.

The price of power at the present time, the position information on the image forming apparatus at the normal mode, and inquiry information with reference to the printing such as the printing confirmation, the printing reservation, and the printing cancellation may be displayed on the terminal.

With reference to the inquiry information display, the examples such as "The price of power at the present time is higher than the standard price of power."; "Do you still wish to continue with printing (D: printing confirmation)?"; "Do you wish to continue printing at the time when the price of power is lower than the standard price of power (R: printing reservation)?"; "Do you wish to cancel printing (C: printing cancellation)?" may be displayed.

One of among the printing confirmation, the printing reservation, and the printing cancellation may be decided by the user, and the terminal transmits the information decided to the power management apparatus 300.

Figure 8A:
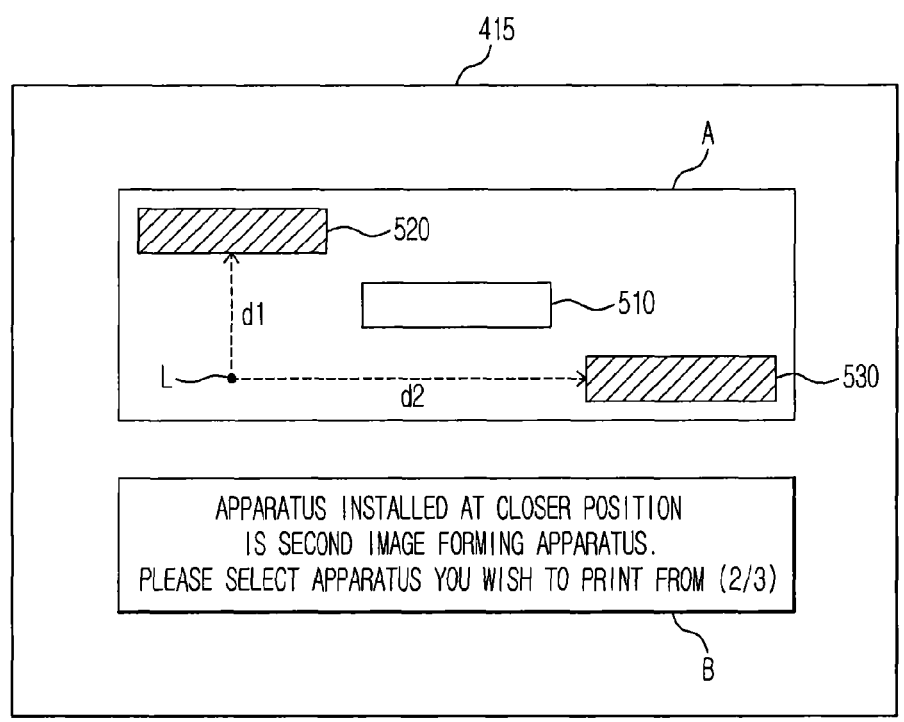
FIGS. 8A and 8B illustrate an information display of the terminal that communicates with the power management apparatus of the power management system according to an embodiment.
Figure 8B:
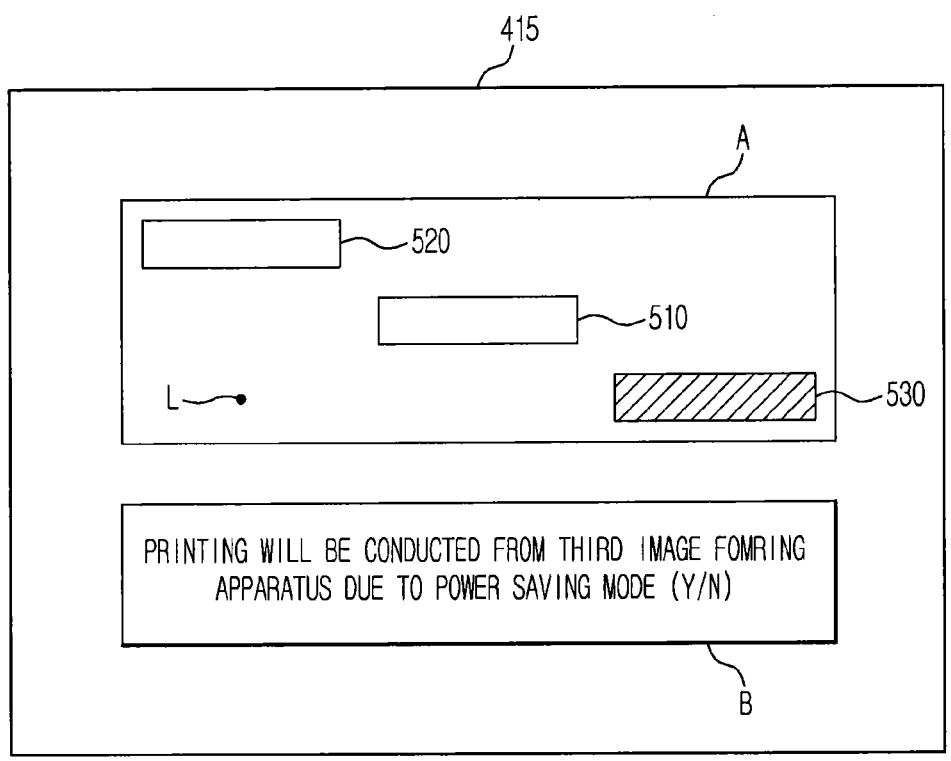

An exemplary position information display of the remaining image forming apparatuses is illustrated in FIGS. 8A and 8B.

Referring to FIG. 8A, the positions of the second and the third image forming apparatuses 520 and 530 at the normal mode are displayed when two image forming apparatuses are at the normal mode. The second and the third image forming apparatuses 520 and 530 at the normal mode and the first image forming apparatus 510 at the power saving mode may be displayed differently.

The distance d1 and d2 from the terminal to the second and the third image forming apparatuses 520 and 530, respectively, may be displayed and an image forming apparatus determined which is closer to the terminal is determined by comparing the position of the second and the third image forming apparatuses 520 and 530 at the normal mode with the position of the terminal L; and notification information saying that receiving a printed material through the image forming apparatus determined is possible is output.

Inquiry information on which image forming apparatus among the two of the second and the third image forming apparatuses 520 and 530 may be used for the printing is displayed.

The terminal is capable of printing a display window A displaying the position of the image forming apparatus at the normal mode and a display window B displaying the inquiry information on the second display unit 415 in the form of pop-ups. A position of the corresponding image forming apparatus may be guided to the user through a layout plan of the office space.

When the user conducts the printing command, the printing information may pop up on the terminal, notifying that the printing is conducted at another image forming apparatus, which is not set up due to the expensive price of power, thereby enhancing the convenience of the user.

As illustrated on FIG. 8B, if one image forming apparatus is in the normal mode, the position of the third image forming apparatus 530 at the normal mode is displayed. The third image forming apparatuses 530 at the normal mode may be displayed differently from the first and the second image forming apparatuses 510 and 520 at the power saving mode.

By comparing the position of the third image forming apparatus 530 and a position L of the terminal, position information of the third image forming apparatus 530 with reference to the position (L) of the terminal in the form of a text may be printed.

For example, the terminal prints the position information with explanation of the third image forming apparatus 530 such as "Printing is available through the image forming apparatus located on the horizon on the right."

The reception of the printed material may be made convenient in a case when the printed material is printed through the image forming apparatus at the normal mode.

The terminal is capable of printing the display window A displaying the position of the image forming apparatus at the normal mode and the display window B displaying the inquiry information on the second display unit 415 in the form of pop-ups.

The power management apparatus 300 determines (operation 710) if a command received from the terminal is a printing conformation command.

The power management apparatus 300, if a printing confirmation command is received from the terminal, conducts the printing through the image forming apparatus selected by the user.

An exemplary process of conducting printing is disclosed.

Among the information received from the terminal, information on the image forming apparatus which is set up at the terminal may be checked.

It may be determined whether the image forming apparatus, which is set up at the terminal is at the power saving mode; and if the image forming apparatus determined is at the power saving mode, an IP address of the image forming apparatus, which is set up at the terminal, is changed to an IP address of an image forming apparatus, which is controlled at the normal mode.

If the image forming apparatus, which is set up at the terminal, is at the power saving mode, an printing language of the image forming apparatus, which is set up at the terminal, is compared with a printing language of the image forming apparatus at the normal mode; if the printing language of the image forming apparatus, which is set up at the terminal, and the printing language of the image forming apparatus at the normal mode are different, the printing language of the image forming apparatus, which is set up at the terminal, is changed to the printing language of the image forming apparatus, which is controlled at the normal mode.

If the printing language of the image forming apparatus, which is set up at the terminal, and the printing language of the image forming apparatus at the normal mode are identical, the printing language is not changed, and the printing data transmitted from the terminal is printed.

If the image forming apparatus, which is set up at the terminal, is at the normal mode, the printing is conducted through the image forming apparatus, which is set up at the terminal.

An exemplary example is disclosed.

The user intends to print a document using the first terminal. At this time, only the driver of the second image forming apparatus positioned nearby the first terminal is assumed to be installed at the first terminal.

The user requests the printing at the first terminal as usual, and the driver which is set up at the first terminal generates a printing language of the second image forming apparatus, and transmits a printing command along with the IP address of the second image forming apparatus to the power management apparatus.

However, if the second image forming apparatus is at the power saving mode because of the price of the power at the present time is higher than the standard price of power, and if the first image forming apparatus is at the normal mode, the printing command placed by the user may not be conducted at the second image forming apparatus.

The power management apparatus, in order for the printing language recognized at the second image forming apparatus to be recognized at the first image forming apparatus by using a language translation module, automatically changes the printing language of the second image forming apparatus to a printing language of the first image forming apparatus.

The power management apparatus, by using an IP remapping, changes the IP address of the second image forming apparatus to the IP address of the second image forming apparatus (operation 711). With such, the printing data of the terminal is transmitted to the first image forming apparatus, not to the second image forming apparatus.

Through a series of processes, the user, may conduct the printing without additional tasks (operation 712).

The power management apparatus, when the printing is complete (operation 713), transmits the printing completion information and the position information of the image forming apparatus at where the printing is conducted to the terminal (operation 714).

The printing completion information and the position information of the image forming apparatus at where the printing is conducted are displayed together at the display unit at the terminal.

Even after the printing is completed, notifying the user again the information on at which image forming apparatus the printing is conducted, the printing completion information, and the position information of the corresponding image forming apparatus may be possible.

The power management apparatus 300 determines, in a case the command received is not the printing confirmation command, if the command received is a printing reservation command.

The power management apparatus 300, if the printing reservation command is received, based on the price of power on an hourly basis, determines the time when the price of power is below the standard price of power, and determines the time determined as the printing availability time.

The power management apparatus 300, by deducting the present time from the printing availability time, determines the printing standby time, transmits the printing standby time (operation 716), counts the time to determine the elapse of the printing standby time, determines whether the time counted elapses the printing standby time (operation 717), and conducts the printing if the time counted elapses the printing standby time. As such, the user may be able to conduct the printing when the price of power is inexpensive.

Since the process of conducting the printing is similar with operations 711 to 714, the detailed explanation is omitted.

The power management apparatus 300, if the printing reservation command is received, is possible to change the state to the printing standby state.

The power management apparatus 300, if the received command is not the printing confirmation command or the printing reservation command, determines if the command received is the printing cancellation command (operation 718); if the command received is not the printing cancellation command, the power management apparatus 300 re-determines from whether the printing is confirmed.

The power management apparatus 300, if the command received is the printing cancellation command, conducts the printing cancellation, and notifies the terminal that the printing is cancelled.

Figure 9:
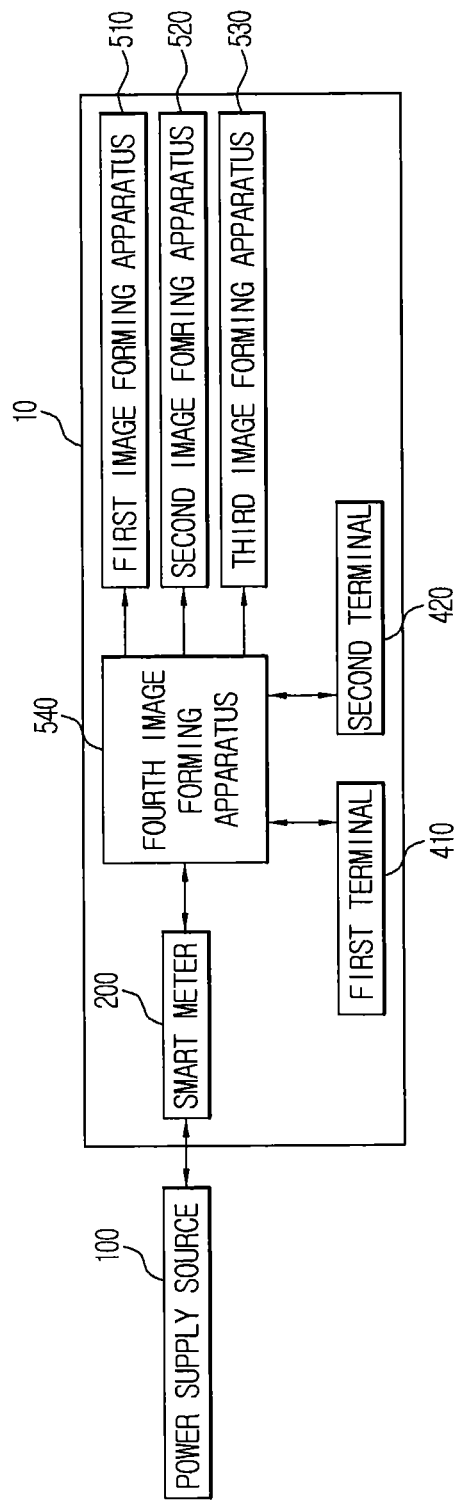
FIG. 9 illustrates a power management system provided with an image forming apparatus according to an embodiment.
Figure 10:
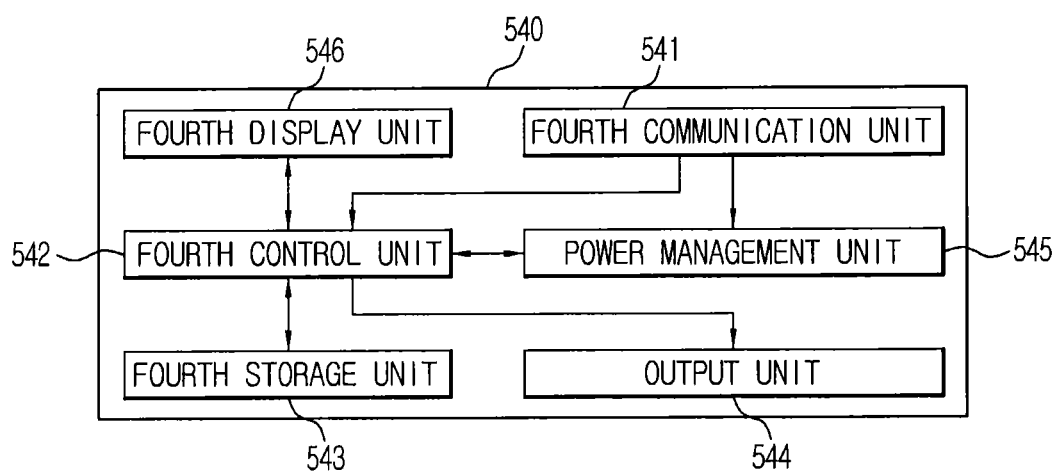
FIG. 10 illustrates the image forming apparatus according to an embodiment.

FIG. 9 illustrates a power management system provided with an image forming apparatus according to an embodiment. FIG. 10 illustrates the image forming apparatus according to an embodiment.

The power supply source 100 is similar to those used in other exemplary embodiments.

The smart meter 200, the plurality of terminals 410 and 420, and the plurality of another image forming apparatuses 510, 520, and 530 conduct a communication, for example, not with the power management apparatus 300, but with a fourth image forming apparatus having a power management function.

The fourth image forming apparatus 540 conducts the printing requested by the terminal, and manages the power consumed at the other image forming apparatuses 510, 520, and 530.

As illustrated in FIG. 10, the fourth image forming apparatus 540 includes a fourth communication unit 541, a fourth control unit 542, a fourth storage unit 543, an output unit 544, a power management unit 545, and a fourth display unit 546.

The fourth communication unit 541 conducts a communication with another image forming apparatus, and receives information on the price of power.

The fourth communication unit 541 transmits the mode information such as the power saving mode, and the normal mode to each of the other image forming apparatuses, and transmits printing information to a terminal which has requested the printing at the time of the printing.

The fourth control unit 542, when the printing command is transmitted from a certain terminal in a case the power management mode is cancelled, controls the print unit 544 for the printing to be conducted.

The fourth control unit 542, if IP addresses and printing languages are transmitted from the plurality of terminals 410 and 420 and the other image forming apparatuses 510, 520, and 530, controls the storage of the IP addresses and the printing languages transmitted.

The fourth storage unit 543 stores the function information, the position, the standby power, the consumption power and the usage frequency of the other image forming apparatuses, and stores the position of the plurality of terminals.

The fourth storage unit 543 stores the price of power on an hourly basis, the standard price of power, the priority order of the image forming apparatuses which are to be controlled at the normal mode, and the printing data transmitted from the terminal for a certain period of time.

The fourth storage unit 543 stores its IP address and the printing language, and stores the IP addresses and the printing language of the plurality of terminals 410 and 420, and the other image forming apparatuses 510, 520 and 530.

The output unit 544 conducts the printing task according to the command of the fourth control unit 542.

The power management unit 545 compares the information on the price of power at the present time among the information received on the price of power on an hourly basis with the information on the standard price of power, and determines whether to establish or cancel the power management mode.

The power management unit 545 compares the price of power at the present time among the information received on the price of power on an hourly basis with the standard price of power, and if the price of power at the present time is higher than the standard price of power, controls at least one of the other image forming apparatuses at the power saving mode.

The power management unit 545 determines the price difference by comparing the price of power at the present time with the standard price of power, and based on the price difference determined, controls at least one of the other image forming apparatuses at the normal mode.

The power management unit 545 decides the image forming apparatus which is to be conducted at the normal mode, based on one of among the number of functions that each of the other image forming apparatuses has, the each usage frequency of the other image forming apparatuses, the standby power and the consumption power of the other image forming apparatuses, and the position of each of the other image forming apparatuses.

The power management unit 545, if the image forming apparatus which is requested with a printing via the terminal is at the power saving mode, changes an IP address of the image forming apparatus which is requested with the printing to its IP address.

The power management unit 545, if the image forming apparatus which is requested with a printing via the terminal is at the power saving mode, changes a printing language of the image forming apparatus which is requested with the printing to its printing language.

The power management unit 545, if the printing is requested by a certain terminal in a state of the price of power at a present time is higher than the standard price of power, transmits the price of power at the present time and information on the printing inquiry to the certain terminal. The information on the printing inquiry is information for printing cancellation, printing confirmation, or printing reservation.

The fourth display unit 546 displays the establishment and the cancellation of the power management mode, and in a case of the power saving mode, differently displays the image forming apparatus at the normal mode and the image forming apparatus at the power saving mode to one another.

The first display unit 546 is capable of displaying the price of power on an hourly basis.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A power management apparatus, comprising:
    a communication unit configured to receive information on a price of power and communicate with a plurality of image forming apparatuses; and
    a control unit configured to control at least one image forming apparatus among the plurality of image forming apparatuses at a normal mode and control the remaining image forming apparatuses at a power saving mode by comparing the information received on the price of power with information on a standard price of power on a periodic basis.

2. The power management apparatus of claim 1 wherein the communication unit conducts a communication with at least one terminal, and
    the control unit determines the image forming apparatus at a normal mode if a printing is requested by the at least one terminal, and controls a transmission of position information of the image forming apparatus determined.

3. The power management apparatus of claim 1, further comprising a storage unit configured to store information on functions of the plurality of image forming apparatuses, and
    wherein the control unit determines an image forming apparatus having the most number of the functions among the image forming apparatuses and controls the determined image forming apparatus at a normal mode.

4. The power management apparatus of claim 1, further comprising a storage unit configured to store a standby power and a consumption power of the plurality of image forming apparatuses, and
    wherein the control unit determines an image forming apparatus having the lowest standby power and the lowest consumption power among the image forming apparatuses by comparing the standby power with the consumption power of the plurality of image forming apparatuses, and controls the determined image forming apparatus at a normal mode.

5. The power management apparatus of claim 1, wherein the control unit decides the number of image forming apparatuses to conduct a normal mode according to the information on the price of power.

6. The power management apparatus of claim 1, further comprising an input unit which receives the information on the price of power.

7. The power management apparatus of claim 1, wherein the control unit, if the image forming apparatus which is requested with the printing through the terminal is at a power saving mode, changes an IP address of the image forming apparatus, which is requested with the printing, to an IP address of the image forming apparatus at a normal mode.

8. The power management apparatus of claim 1, wherein the control unit, if the image forming apparatus which is requested with the printing through the terminal is at a power saving mode, compares a printing language of the image forming apparatus which is requested with the printing with a printing language of the image forming apparatus at a normal mode; and if the two printing languages are different, changes the printing language of the image forming apparatus, which is requested with the printing, to the printing language of the image forming apparatus at a normal mode.

9. The power management apparatus of claim 1, wherein the control unit, if a printing is requested from at least one terminal in a state of when the information on the price of power is higher than the standard price of power, controls a transmission of the information on the price of power and information on printing inquiry to the terminal.

10. The power management apparatus of claim 9, wherein the control unit determines a printing availability time based on the information of the price of power and controls a transmission of the printing availability time determined.

11. The power management apparatus of claim 1, wherein the comparing the information received on the price of power with information on the standard price of power is on an hourly basis.

12. A power management apparatus, comprising:
    a communication unit configured to receive information on a price of power and communicate with a plurality of image forming apparatuses;
    a control unit configured to control at least one image forming apparatus among the plurality of image forming apparatuses at a normal mode and control the remaining image forming apparatuses at a power saving mode by comparing the information received on the price of power with information on a standard price of power; and
    a storage unit configured to store positions of the plurality of image forming apparatuses and a plurality of terminals, and wherein the control unit determines a position where the terminals are most concentrated based on the positions of the plurality of terminals, and controls the image forming apparatus, which is most closely installed to the position determined, at a normal mode.

13. A power management apparatus, comprising:
a communication unit configured to receive information on a price of power and communicate with a plurality of image forming apparatuses;
a control unit configured to control at least one image forming apparatus among the plurality of image forming apparatuses at a normal mode and control the remaining image forming apparatuses at a power saving mode by comparing the information received on the price of power with information on a standard price of power; and
a storage unit which stores a usage frequency of the plurality of image forming apparatuses, and
wherein the control unit determines an image forming apparatus having the highest usage frequency among the image forming apparatuses, and controls the determined image forming apparatus at a normal mode.

14. A power management apparatus, comprising:
a communication unit configured to receive information on a price of power and communicate with a plurality of image forming apparatuses;
a control unit configured to control at least one image forming apparatus among the plurality of image forming apparatuses at a normal mode and control the remaining image forming apparatuses at a power saving mode by comparing the information received on the price of power with information on a standard price of power;
an input unit configured to receive a priority order for a normal mode control of the plurality of image forming apparatuses; and
a storage unit configured to store the priority order received, and
wherein the control unit determines an image forming apparatus to conduct a normal mode among the image forming apparatuses according to the priority order selected by a user.

15. An image forming apparatus, comprising:
a communication unit configured to conduct a communication with at least one another image forming apparatus and receive a price of power from the at least one other image forming apparatus;
a power management unit configured to compare the price of power received with a standard price of power and control the at least one other image forming apparatus at a power saving mode if the price of the power received is higher than the standard price of power; and
a control unit configured to control a printing if the printing is requested from a terminal corresponding to the at least one other image forming apparatus in a state of the at least one other image forming apparatus is at a power saving mode.

16. The image forming apparatus of claim 15, further comprising a storage unit configured to store information of functions of the at least one other image forming apparatus, positions of the at least one other image forming apparatus, a standby power and a consumption power of the at least one other image forming apparatus, a usage frequency of the at least one other image forming apparatus, and positions of the at least one other image forming apparatus,
wherein the power management unit determines an image forming apparatus to be conducted at a normal mode based on at least one of the number of functions, the usage frequency, the standby power, the consumption power and the position of the at least one other image forming apparatus, and the position of the terminal corresponding to the at least one other image forming apparatus.

17. The image forming apparatus of claim 15, wherein the power management unit, if the other image forming apparatus is in plurality, compares the price of power received with the standard price of power to determine a price difference, and based on the price difference, controls at least one of the other image forming apparatuses at a normal mode.

18. The image forming apparatus of claim 15, wherein the power management unit, if one of the other image forming apparatuses, which is requested with the printing through the terminal, is at a power saving mode, changes an IP address of the image forming apparatus which is requested with the printing to an IP address of the image forming apparatus.

19. The image forming apparatus of claim 15, wherein the control unit, if one of the other image forming apparatuses, which is requested with the printing through the terminal is at a power saving mode, changes a printing language of the image forming apparatus which is requested with the printing to a printing language of the image forming apparatus.

20. A power management method of managing a consumption power of a plurality of image forming apparatuses installed in a power management domain, the power management method, comprising:
checking a time variant price of power;
comparing a standard price of power with a price of power at a present time with a time variant price of power;
controlling at least one of the plurality of the image forming apparatuses at a normal mode if the price of power at the present time is higher than the standard price of power; and
controlling the remaining image forming apparatuses at a power saving mode.

21. The power management method of claim 20, further comprising controlling the plurality of image forming apparatuses at a normal mode if the price of power at a present time is lower than the standard price of power.

22. The power management method of claim 20, wherein the controlling of at least one of the image forming apparatuses at a normal mode comprises:
calculating a price difference between the price of power at a present time and the standard price of power, and
deciding the number of image forming apparatuses which are to be controlled at a normal mode based on the price difference calculated.

23. The power management method of claim 20, further comprising, if a printing is requested from a terminal in a state of when the price of power at a present time is higher than the standard price of power, transmitting information on the price of power at the present time, and a printing inquiry including a printing confirmation, a printing reservation, and a printing cancellation to the terminal.

24. The power management method of claim 23, further comprising,
if a printing reservation command is received from the terminal, determining a time when the price of power is below the standard price of power based on the time variant price of power, and
transmitting the determined time to the terminal as a printing availability time.

25. The power management method of claim 23, further comprising cancelling the printing when a printing cancellation command is received from the terminal.

26. The power management method of claim 23, further comprising, in a case when the image forming apparatus controlled at a normal mode is in plurality, determining an image forming apparatus closest to the terminal which has requested a printing based on each position of the plurality of image forming apparatuses controlled at the normal mode and the terminal, and
 deciding the image forming apparatus as an image forming apparatus for conducting the printing.

27. The power management method of claim 23, further comprising:
 in a case when the image forming apparatuses controlled at a normal mode is in plurality, outputting information of the plurality of image forming apparatuses controlled at the normal mode on a display, and
 if information on a certain image forming apparatus among the plurality of image forming apparatuses is received from the terminal, deciding the certain image forming apparatus as an image forming apparatus for conducting a printing.

28. The power management method of claim 20, further comprising conducting a printing through the image forming apparatus which is controlled at a normal mode when a printing confirmation command is received from the terminal.

29. The power management method of claim 28, further comprising, after the printing is completed, transmitting information on the printing completion and information on the image forming apparatus at where the printing is conducted to the terminal.

30. The power management method of claim 20, further comprising:
 if a printing is requested through a terminal, determining an image forming apparatus which is requested with the printing through the terminal,
 determining whether the image forming apparatus determined is at a power saving mode, and
 if the image forming apparatus which is requested with the printing is at a power saving mode, changing an IP address of the image forming apparatus which is requested with the printing to an IP address of the image forming apparatus controlled at a normal mode.

31. The power management method of claim 30, further comprising:
 comparing a printing language of the image forming apparatus which is requested with the printing with a printing language of the image forming apparatus at a normal mode; and
 changing the printing language of the image forming apparatus which is requested with the printing to the printing language of the image forming apparatus controlled at the normal mode if the printing language of the image forming apparatus which is requested with the printing and the printing language of the image forming apparatus at the normal mode are different.

32. The power management method of claim 30, wherein the controlling of the at least one image forming apparatus at a normal mode further comprises:
 deciding an image forming apparatus to be conducted at a normal mode based on at least one of function information of the plurality of image forming apparatuses, positions of the plurality of image forming apparatuses, standby power information and consumption power information of the plurality of image forming apparatuses, usage frequency information of the plurality of image forming apparatuses, and position information of at least one terminal.

33. The power management method of claim 20, wherein the checking of the time variant price of power comprises checking a time variant price of power transmitted from outside.

34. The power management method of claim 20, wherein the checking of the time variant price of power comprises checking a time variant price of power input through an input unit.

35. A management method of managing a plurality of apparatuses, the method, comprising:
 checking with a processor a value of a time dependent variable of an item;
 comparing a standard value of the variable with a value of the variable at a present time on a periodic basis; and
 controlling a number of the plurality of the apparatuses operated in each of a first mode and a second mode based on the compared values.

\* \* \* \* \*

UNITED STATES PATENT AND TRADEMARK OFFICE
CERTIFICATE OF CORRECTION

PATENT NO.       : 8,947,692 B2  
APPLICATION NO.  : 13/712392  
DATED            : February 3, 2015  
INVENTOR(S)      : Young Jin Park It is certified that error appears in the above-identified patent and that said Letters Patent is hereby corrected as shown below:

In the Claims

Claim 32, column 24, line 12, delete "claim 30," and insert --claim 20,-- therefor.

Signed and Sealed this  
Thirtieth Day of June, 2015

Michelle K. Lee  
*Director of the United States Patent and Trademark Office*